US011408857B2

United States Patent
Jiang et al.

(10) Patent No.: US 11,408,857 B2
(45) Date of Patent: Aug. 9, 2022

(54) METHOD, APPARATUS AND SYSTEM FOR DETECTING INTERNAL DEFECT IN PROTECTIVE HEADGEAR

(71) Applicant: HONEYWELL INTERNATIONAL INC., Charlotte, NC (US)

(72) Inventors: Lei Jiang, Shanghai (CN); Wei Sun, Shanghai (CN); Junyan Xu, Shanghai (CN); Zhixiong Hou, Shanghai (CN); Feng Cao, Fengxian (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 236 days.

(21) Appl. No.: 16/898,944

(22) Filed: Jun. 11, 2020

(65) Prior Publication Data

US 2020/0400616 A1 Dec. 24, 2020

(30) Foreign Application Priority Data

Jun. 20, 2019 (CN) .......................... 201910536202.0

(51) Int. Cl.
*G08B 21/00* (2006.01)
*G01N 29/04* (2006.01)
(Continued)

(52) U.S. Cl.
CPC ........... *G01N 29/043* (2013.01); *A42B 3/046* (2013.01); *A42B 3/0453* (2013.01); *G01N 29/4427* (2013.01)

(58) Field of Classification Search
CPC ............. G01N 29/043; G01N 29/4427; G01N 2291/10; G01N 29/11; G01N 29/04;
(Continued)

(56) References Cited

U.S. PATENT DOCUMENTS 7,298,258 B1 * 11/2007 Hudgens ................. F16P 3/147
340/3.1
2007/0056081 A1 3/2007 Skinner et al.
2009/0283596 A1 11/2009 Grummett

FOREIGN PATENT DOCUMENTS

GB 2488770 A 9/2012
JP H05-085821 U 11/1993
(Continued)

OTHER PUBLICATIONS

Extended European Search Report issued in European Application No. 20180641.1 dated Nov. 17, 2020, 8 pages.
(Continued)

*Primary Examiner* — Toan N Pham
(74) *Attorney, Agent, or Firm* — Alston & Bird LLP

(57) ABSTRACT

Methods, apparatuses, and systems for detecting internal defects of a protective headgear are provided. An example apparatus may include a protective headgear, an actuator element integrated within the protective headgear, a sensor element integrated within the protective headgear, and a processor element electronically coupled to the actuator element and the sensor element. In some examples, the processor element is configured to cause the actuator element to generate a first ultrasonic wave, wherein the first ultrasonic wave is propagated in the protective headgear, and receive a first output from the sensor element in response to the first ultrasonic wave.

20 Claims, 5 Drawing Sheets

(51) Int. Cl.
*A42B 3/04* (2006.01)
*G01N 29/44* (2006.01)

(58) Field of Classification Search
CPC .... G01N 2291/0289; G01N 2291/2698; A42B 3/0453; A42B 3/046; A42B 3/30; A42B 3/0433
See application file for complete search history.

(56) References Cited

FOREIGN PATENT DOCUMENTS

| WO | 2016/086230 A1 | 6/2016 | |
|---|---|---|---|
| WO | 2017/183816 A1 | 10/2017 | |
| WO | WO-2019100119 A1 * | 5/2019 | ........... G01B 11/162 |
| WO | WO-2020216986 A1 * | 10/2020 | ............. A42B 3/046 |

OTHER PUBLICATIONS

Office Action issued in Canadian Application No. 3,083,441 dated Jul. 7, 2021, 4 pages.

* cited by examiner

METHOD, APPARATUS AND SYSTEM FOR DETECTING INTERNAL DEFECT IN PROTECTIVE HEADGEAR

CROSS-REFERENCE TO RELATED APPLICATIONS

This specification is based upon and claims the benefit of priority from Chinese patent application number CN 201910536202.0 filed on Jun. 20, 2019, the entire contents of which are incorporated herein by reference.

FIELD OF THE INVENTION

The present disclosure relates generally to methods, apparatuses, and systems associated with a protective headgear, and more particularly, to methods, apparatuses, and systems for providing a protective headgear comprising integrated actuator element(s) and sensor element(s) for detecting internal defect in the protective headgear.

BACKGROUND

In workplace environments (such as, but not limited to, construction sites, demolition sites, warehouse sites), workers may be exposed to head injurie risks due to, for example, accidentally dropped objects that may strike worker's head, worker accidentally bumping his head against fixtures (such as exposed beams), and electric shock resulting from accidental head contact. In many situations, protecting workers from head injury risks may be an important element in a workplace safety program.

Protective headgear is a type of personal protective equipment (PPE) that may reduce head injury risks while a user is wearing the protective headgear. Example forms of protective headgear may include, but not limited to, safety helmet, bump hat, and hard hat. For example, hard hats may protect workers from impact forces and penetration hazards to the head, and may also reduce the risk of being exposed to electric shock. Further, wearing a hard hat may make the worker more visible to others in the workplace environment.

However, existing systems and methods do not overcome many technical challenges and difficulties associated with protective headgear. For example, existing systems and methods fail to provide an effective and efficient way to detect internal defect(s) of protective headgear. Example internal defects may include, but not limited to, perforation, deformity, cracking, tearing, aging, and injection defects in or on the protective headgear. In some examples, internal defect(s) may not be visible when the protective headgear is inspected with a naked eye. A worker may unknowingly wear a protective headgear provided by the existing systems and methods that comprise internal defect(s), which may pose safety risks to the worker.

BRIEF SUMMARY

Various embodiments described herein relate to methods, apparatuses, and systems for providing a protective headgear. In particular, various embodiments are related to detecting internal defect(s) of protective headgear based on, for example, actuator element(s) and sensor element(s) that are integrated within the protective headgear.

In accordance with various embodiments of the present disclosure, an example apparatus is provided. The example apparatus may comprise a protective headgear, an actuator element integrated within the protective headgear, a sensor element integrated within the protective headgear, and a processor element electronically coupled to the actuator element and the sensor element. In some examples, the processor element may be configured to: cause the actuator element to generate a first ultrasonic wave, and receive a first output from the sensor element in response to the first ultrasonic wave. In some examples, the first ultrasonic wave may be propagated in the protective headgear.

In some examples, the processor element may be further configured to cause the actuator element to generate a second ultrasonic wave, receive a second output from the sensor element in response to the second ultrasonic wave, and determine whether the protective headgear comprises an internal defect based on the first output and the second output. In some examples, the second ultrasonic wave is propagated in the protective headgear.

In some examples, when determining whether the protective headgear comprises the internal defect, the processor element may be further configured to calculate an output difference between the second output and the first output, and determine whether the output difference satisfies a pre-determined threshold.

In some examples, the example apparatus may further comprise a speaker element that is disposed on an outer surface of the protective headgear and electronically coupled to the processor element. In some examples, the processor element may be further configured to: determine that the output difference does not satisfy the pre-determined threshold, and in response to determining that the output difference does not satisfy the pre-determined threshold, cause the speaker element to output an audio alert.

In some examples, the example apparatus may further comprise a light-emitting diode (LED) element that is disposed on an outer surface of the protective headgear and electronically coupled to the processor element. In some examples, the processor element may be further configured to: determine that the output difference does not satisfy the pre-determined threshold, and in response to determining that the output difference does not satisfy the pre-determined threshold, cause the LED element to generate a visual alert.

In some examples, the example apparatus may further comprise a vibrator element that is integrated within the protective headgear and electronically coupled to the processor element. In some examples, the processor element may be further configured to: determine that the output difference does not satisfy the pre-determined threshold, and in response to determining that the output difference does not satisfy the pre-determined threshold, cause the vibrator element to generate a vibration.

In some examples, the processor element may be further configured to transmit the first output and the second output to a computing device, and cause a rendering of the first output and the second output on a display of the computing device.

In accordance with various embodiments of the present disclosure, an example method for detecting an internal defect of a protective headgear is provided. The example method may comprise causing an actuator element to generate a first ultrasonic wave, and receiving a first output from a sensor element in response to the first ultrasonic wave. In some examples, the actuator element is integrated within the protective headgear. In some examples, the sensor element is integrated within the protective headgear. In some examples, the first ultrasonic wave is propagated in the protective headgear.

In some examples, the example method may further comprise causing the actuator element to generate a second ultrasonic wave, receiving a second output from the sensor element in response to the second ultrasonic wave, and determining whether the protective headgear comprises the internal defect based on the first output and the second output. In some examples, the second ultrasonic wave is propagated in the protective headgear.

In accordance with various embodiments of the present disclosure, an example computer program product is provided. The example computer program product comprises at least one non-transitory computer-readable storage medium having computer-readable program code portions stored therein, the computer-readable program code portions comprising an executable portion configured to: cause an actuator element to generate a first ultrasonic wave, and receive a first output from a sensor element in response to the first ultrasonic wave. In some examples, the actuator element is integrated within a protective headgear, and the sensor element is integrated within the protective headgear. In some examples, the first ultrasonic wave is propagated in the protective headgear.

In accordance with various embodiments of the present disclosure, an example system is provided. The example system may comprise a plurality of protective headgears in electronic communication with a computing device. Each of the protective headgears may comprise an actuator element, a sensor element, and a processor element that are integrated within the protective headgear. The computing device may provide a user interface that facilitates status management of the protective headgears.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that specific component or feature is not required to be included or to have the characteristic. Such component or feature may be optionally included in some embodiments, or it may be excluded.

The term "electronically coupled" in the present disclosure refers to two or more components (for example but not limited to, actuator element(s), sensor element(s), processor element(s), speaker element(s), light-emitting diode (LED) element(s), vibrator element(s)) and/or electric circuit(s) being connected through wired means (for example but not limited to, conductive wires or traces) and/or wireless means (for example but not limited to, electromagnetic field), such that data and/or information may be transmitted to and/or received from the components that are electronically coupled.

As described above, existing systems and methods do not overcome many technical challenges and difficulties associated with protective headgear. In accordance with various embodiments of the present disclosure, example methods, systems, and apparatuses may provide an effective way to detect internal defect(s) of a protective headgear by, for example, integrating an actuator element, a sensor element, and a processor element within the protective headgear.

Figure 1:
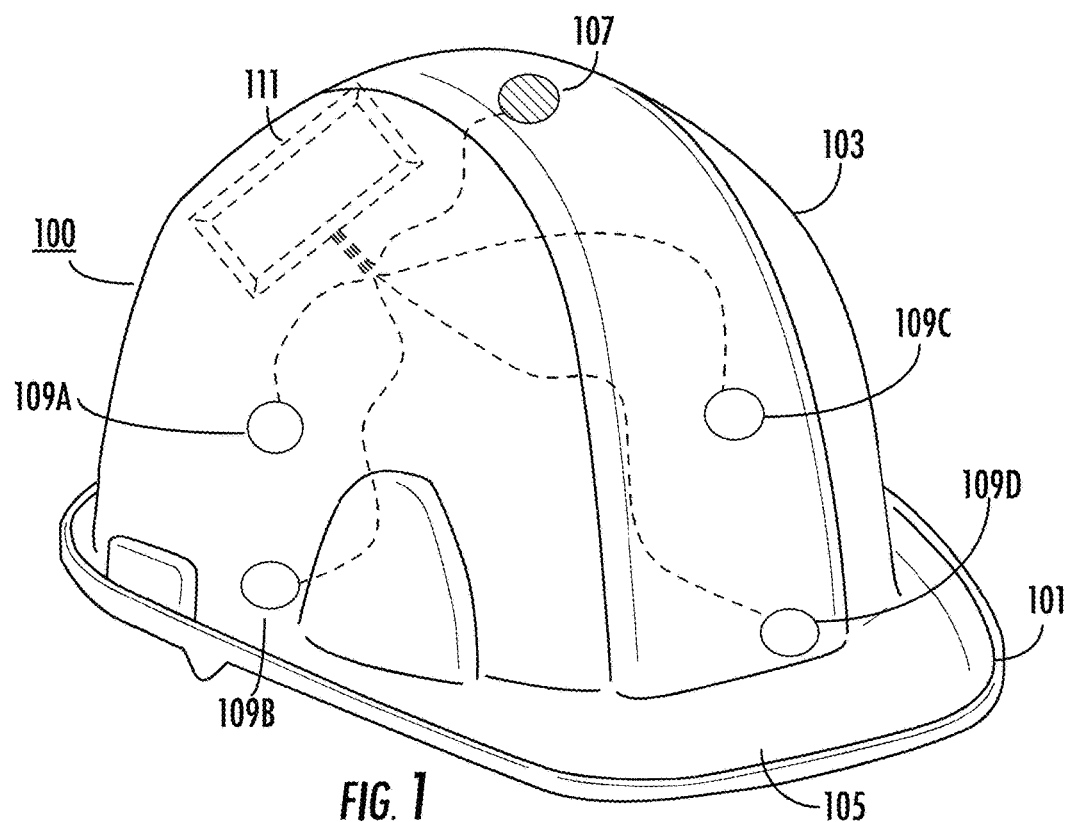
FIG. 1 illustrates an example schematic diagram of an example apparatus in accordance with various embodiments of the present disclosure.

Referring now to FIG. 1, an example apparatus 100 in accordance with various embodiments of the present disclosure is shown. In the example embodiment as shown in FIG. 1, the example apparatus 100 may comprise a protective headgear 101, an actuator element 107, a plurality of sensor elements (including sensor elements 109A, 109B, 109C, and 109D), and a processor element 111. The protective headgear 101 may comprise a shell portion 103 and a brim portion 105.

In some examples, the shell portion 103 of the protective headgear 101 may be in a shape similar to a hollow hemisphere or a hollow hemi-ellipsoid such that, when a user wears the protective headgear 101, the shell portion 103 of the protective headgear 101 may provide a covering for the user's head.

In some examples, the brim portion 105 may be attached to, molded with, or otherwise connected around the bottom edge of the shell portion 103. In some examples, the brim portion 105 of the protective headgear 101 may protect a user from environmental hazards such as falling debris, rain, or sunlight.

In some examples, the protective headgear 101 (including the shell portion 103 and/or the brim portion 105) may comprise material(s) that have durable characteristics so that the protective headgear 101 may, for example, protect the wearer's head from impacts. In some examples, the protective headgear 101 (including the shell portion 103 and/or the brim portion 105) may be at least partially made of metal material, such as aluminum. In some examples, the protective headgear 101 (including the shell portion 103 and/or the brim portion 105) may be at least partially made of plastic material, such as polyethylene (e.g. high-density polyethylene) and/or polycarbonate resin. In some examples, the protective headgear 101 (including the shell portion 103 and/or the brim portion 105) may comprise other suitable materials (such as, for example, fiberglass) without deviating from the scope of the present disclosure.

In some examples, the protective headgear 101 may comprise one or more additional components. For example, the protective headgear 101 may comprise one or more linings disposed on an inner surface of the protective headgear 101. Such linings may incorporate, for example, a headband and suspension bands, which may provide shock absorption during an impact and ventilation during normal wear. For example, when a user wears the protective headgear 101, the user's head may be in contact with the headband and the suspension bands. The headband and the suspension bands may suspend the shell portion 103 away from the user's head (for example, 2 centimeters to 3 centimeters above the user's head).

As another example, the protective headgear 101 may comprise a sweatband disposed on an inner surface of the protective headgear 101. The sweatband may comprise fabric material (such as cotton) that may absorb sweat from a user's head. As another example, the protective headgear 101 may comprise a chin strap, and both ends of the chin strap may be connected to the brim portion 105 of the protective headgear 101.

While the example embodiment as illustrated in FIG. 1 shows that the protective headgear 101 is in the form of a hard hat, it is noted that the scope of the present disclosure is not limited to hard hat. In some examples, the protective headgear 101 may be in other suitable form(s), such as, for example, safety helmet, bump cap, without deviating from the scope of the present disclosure.

Referring back to FIG. 1, the apparatus 100 may comprise one or more electronic elements, such as, for example, an actuator element 107 and one or more sensor elements (for example, sensor elements 109A, 109B, 109C, and 109D).

The term "actuator element" in the present disclosure refers to an electronic component or device that may be configured to generate and/or stimulate ultrasonic wave. In some examples, an actuator element may be in the form of, for example but not limited to, an ultrasonic transducer, which may perform the conversion of electrical energy into mechanical energy (i.e. ultrasonic wave). In some examples, an actuator element of the present disclosure may be in other suitable form(s) without deviating from the scope of the present disclosure.

The term "sensor element" in the present disclosure refers to an electronic component or device that may be configured to detect and/or measure ultrasonic wave. In some examples, a sensor element may be in the form of, for example but not limited to, an ultrasonic receiver, which may perform the conversion of mechanical energy (i.e. ultrasonic wave) into electrical energy, and/or may generate an output (e.g. an electric current) based on the detected ultrasonic wave. In some examples, a sensor element of the present disclosure may be in other suitable form(s) without deviating from the scope of the present disclosure.

In some examples, the actuator element 107 and the one or more sensor elements (for example, sensor elements 109A, 109B, 109C, and 109D) may be integrated within the protective headgear 101. The term "integrated within" refers to a rigid, structural connection between two structural members that prevents one from rotating or moving with respect to the other. For example, the actuator element 107 and/or the sensor elements 109A, 109B, 109C, 109D may be implanted into the protective headgear 101 (e.g. disposed inside a layer of the shell portion 103). As another example, the actuator element 107 and/or the sensor elements 109A, 109B, 109C, 109D may be rigidly bonded or attached on an inner surface of the protective headgear 101 through, for example, an adhesive.

As described above, the actuator element 107 may be configured to generate and/or stimulate ultrasonic waves. Because the actuator element 107 is integrated within the protective headgear 101, the ultrasonic waves generated and/or stimulated by the actuator element 107 may be propagated in the protective headgear 101 (including, for example, the shell portion 103 and the brim portion 105). Further, because the sensor elements 109A, 109B, 109C, and 109D are integrated within the protective headgear 101, these sensor elements (109A, 109B, 109C, and 109D) may detect and/or measure ultrasonic waves that have been propagated at various locations of the protective headgear 101.

Referring back to FIG. 1, the apparatus 100 may also include a processor element 111 that is electronically coupled to the actuator element 107 and the sensor elements 109A, 109B, 109C, and 109D. In some examples, the processor element 111, the actuator element 107, and/or the sensor elements 109A, 109B, 109C, and 109D may be powered by one or more power sources, such as, for example, a battery and/or a power supply unit (PSU).

In some examples, the processor element 111 may be in the form of, for example but not limited to, an application-specific integrated circuit (ASIC) or a central processing unit (CPU). In some examples, the processor element 111 may be in other suitable form(s) without deviating from the scope of the present disclosure.

In some examples, the processor element 111 may cause the actuator element 107 to generate one or more ultrasonic waves that are propagated in the protective headgear 101, and may receive one or more outputs from the sensor elements 109A, 109B, 109C, and 109D in response to the one or more ultrasonic waves. Based on the one or more outputs, internal defect(s) of the protective headgear 101 may be detected, details of which are described in the present disclosure.

While the example embodiment as illustrated in FIG. 1 shows one actuator element 107, it is noted that the scope of the present disclosure is not limited to one actuator element. In some examples, more than one actuator element may be integrated within the protective headgear 101, without deviating from the scope of the present disclosure.

While the example embodiment as illustrated in FIG. 1 shows four sensor elements (sensor elements 109A, 109B, 109C, and 109D), it is noted that the scope of the present disclosure is not limited to four actuator elements. In some examples, less than four or more than four actuator elements may be integrated within the protective headgear 101, without deviating from the scope of the present disclosure.

While the example embodiment as illustrated in FIG. 1 shows that the actuator element 107 is integrated at a top location of the shell portion 103, and that the sensor elements 109A, 109B, 109C, and 109D are integrated at bottom locations of the shell portion 103, it is noted that the scope of the present disclosure is not limited to integrating the actuator element 107 and the sensor elements 109A, 109B, 109C, and 109D at these specific locations. In some examples, an actuator element and/or a sensor element may be integrated at different location(s) than those illustrated in FIG. 1, without deviating from the scope of the present disclosure.

Figure 2:
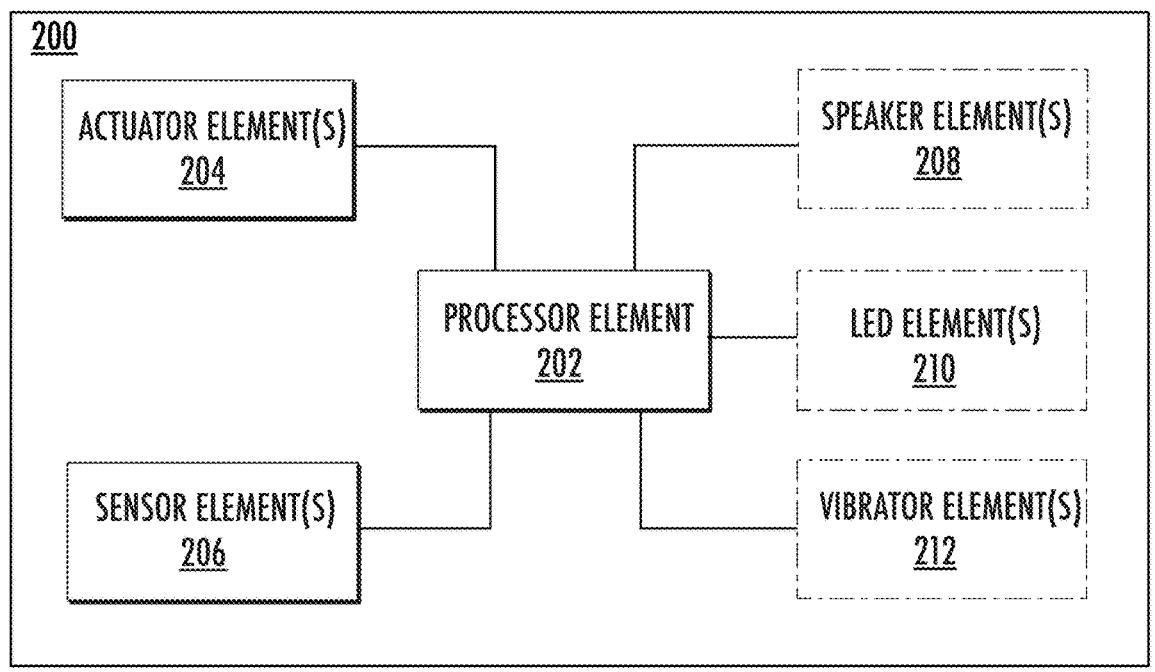
FIG. 2 illustrates an example block diagram of an example apparatus in accordance with various embodiments of the present disclosure.

Referring now to FIG. 2, an example block diagram illustrate various electronic elements of an example apparatus 200 in accordance of the present disclosure is shown. For example, the example apparatus 200 may comprise a processor element 202 that is electronically coupled to the actuator element(s) 204 and the sensor element(s) 206.

In some examples, the processor element 202 may be similar to the processor element 111 described above in connection with FIG. 1. In some examples, the actuator element(s) 204 may be similar to the actuator element 107 described above in connection with FIG. 1. In some examples, the sensor element(s) 206 may be similar to the sensor element described above in connection with FIG. 1 (for example, sensor elements 109A, 109B, 109C, and 109D).

Further, as shown in FIG. 2, the example apparatus 200 may optionally comprise one or more additional electronic elements, including, for example, speaker element(s) 208, light-emitting diode (LED) element(s) 210, and/or vibrator element(s) 212. In some examples, the processor element 202 may be electronically coupled to the speaker element(s) 208, the light-emitting diode (LED) element(s) 210, and/or the vibrator element(s) 212.

In some examples, the speaker element(s) 208 may be disposed on an outer surface of a protective headgear (such as, for example, the protective headgear 101 described above in connection with FIG. 1), and may be configured to output audio alerts (for example, an alarm sound and/or a pre-recorded audio message). In some examples, the speaker element(s) 208 may be in the form of a printed circuit board (PCB) micro speaker. In some examples, the speaker element(s) 208 may be in other suitable form(s), without deviating from the scope of the present disclosure.

In some examples, the light-emitting diode (LED) element(s) 210 may be disposed on an outer surface of a protective headgear (such as, for example, the protective headgear 101 described above in connection with FIG. 1), and may be configured to output a visual alert (for example, a flashing light and/or a red light).

In some examples, the vibrator element(s) 212 may be integrated within a protective headgear (such as, for example, the protective headgear 101 described above in connection with FIG. 1), and may be configured to output a vibration.

Figure 3:
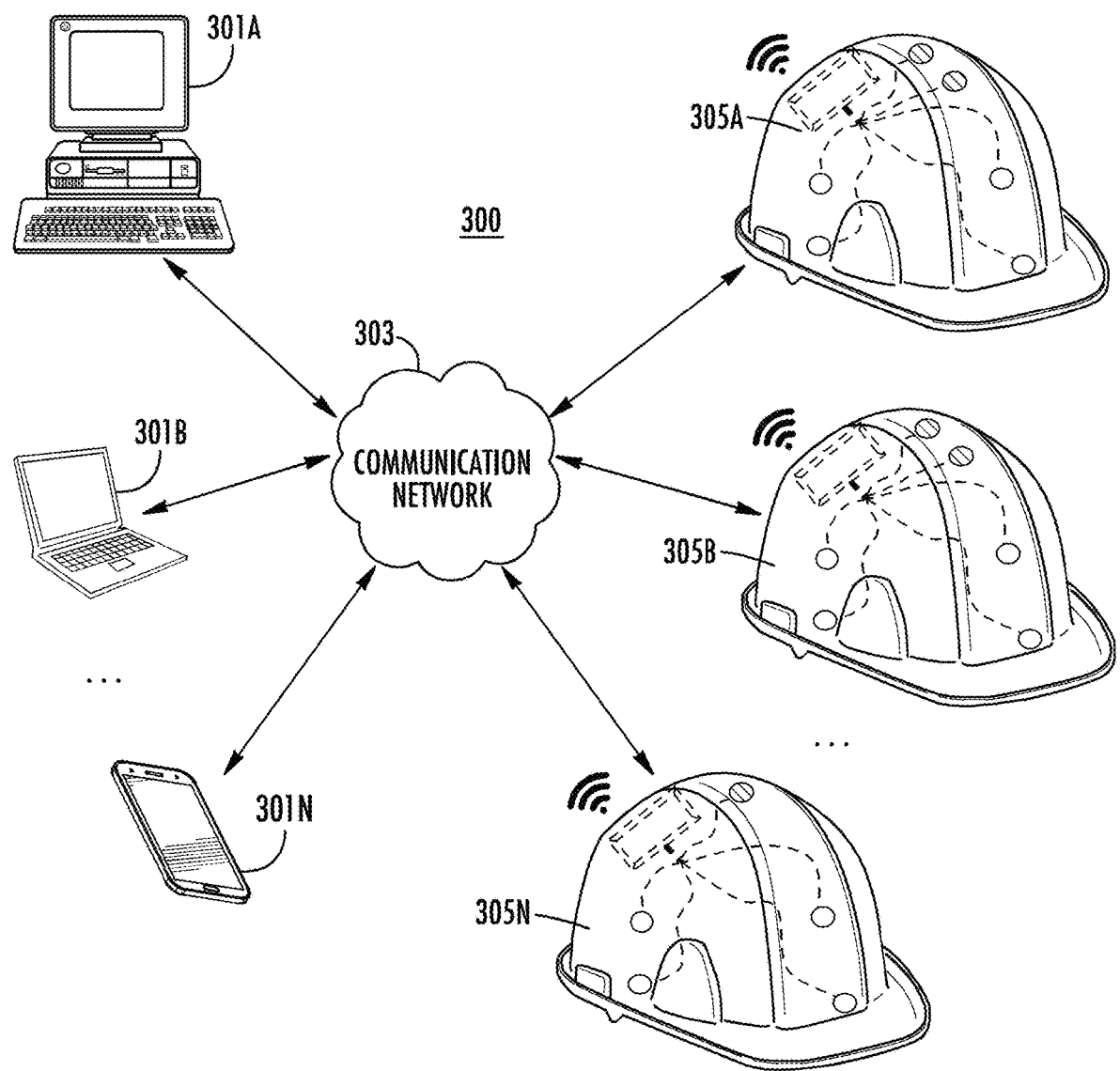
FIG. 3 illustrates an example schematic diagram of an example system in accordance with various embodiments of the present disclosure.

Referring now to FIG. 3, an example system 300 in accordance with various embodiments of the present disclosure is shown. In some examples, the example system 300 may comprise one or more example computing devices (such as, for example, example computing devices 301A, 301B, . . . , 301N) in electronic communication with one or more example apparatuses (such as, for example, apparatuses 305A, 305B, . . . , 305N) via one or more communication networks (such as, for example, a communication network 303).

The communication network 303 may include one or more wired or wireless communication networks including, for example, a wired or wireless local area network (LAN), personal area network (PAN), metropolitan area network (MAN), wide area network (WAN), or the like, as well as any hardware, software and/or firmware required to implement the one or more networks (such as, for example, network routers). For example, communication network 303 may include general packet radio service (GPRS) network, Code Division Multiple Access 2000 (CDMA2000) network, Wideband Code Division Multiple Access (WCDMA) network, Global System for Mobile Communications (GSM) network, Enhanced Data rates for GSM Evolution (EDGE) network, Time Division-Synchronous Code Division Multiple Access (TD-SCDMA) network, Long Term Evolution (LTE) network, High Speed Packet Access (HSPA) network, High-Speed Downlink Packet Access (HSDPA) network, IEEE 802.11 (Wi-Fi), Wi-Fi Direct, and/or IEEE 802.16 (WiMAX). Additionally or alternatively, the communication network 303 may include a public network (such as the Internet), a private network (such as an intranet), or combinations thereof, and may utilize a variety of networking protocols including, but not limited to, TCP/IP based networking protocols, near field communication (NFC) protocols, Bluetooth protocols, and/or ZigBee protocols.

Via the communication network 303, the one or more example computing devices 301A, 301B, . . . , 301N may communicate among each other, and may communicate with the one or more example apparatuses 305A, 305B, . . . , 305N. In some examples, the one or more example computing devices 301A, 301B, . . . , 301N may include servers, desktop computers, laptop computers, smartphones, netbooks, tablet computers, wearables, and the like.

In some examples, the one or more example computing devices 301A, 301B, . . . , 301N may include one or more processors, such as, for example, single core processor(s) and/or multi-core processor(s). The one or more processors may be electronically coupled to one or more memory circuitries, such as, for example, volatile memories and/or non-volatile memories.

In some examples, the one or more example computing devices 301A, 301B, . . . , 301N may include one or more input/output circuitries (for example, display, touch screen, keyboard, mouse, speaker, and/or microphone coupled to one or more processors). For example, one or more input/output circuitries may be configured to provide an application, browser, user interface, dashboard, and/or webpage executing on and/or accessible via an example computing device to cause display of information/data and for user interaction therewith via one or more user interfaces. Example user interfaces are illustrated and described at least in connection with FIGS. 5 and 6.

Referring back to FIG. 3, the one or more example apparatuses 305A, 305B, . . . , 305N may be similar to the example apparatus 100 described above in connection with FIG. 1. Further, the one or more example apparatuses 305A, 305B, . . . , 305N may comprise one or more communications circuitries. The communications circuitries may be, for example, a device or circuitry embodied in either hardware or a combination of hardware and software that is configured to receive and/or transmit data from/to the communication network 303. Such data may include, for example, output(s) from the processor element(s) and/or sensor element(s) of the one or more example apparatuses 305A, 305B, . . . , 305N.

Figure 4:
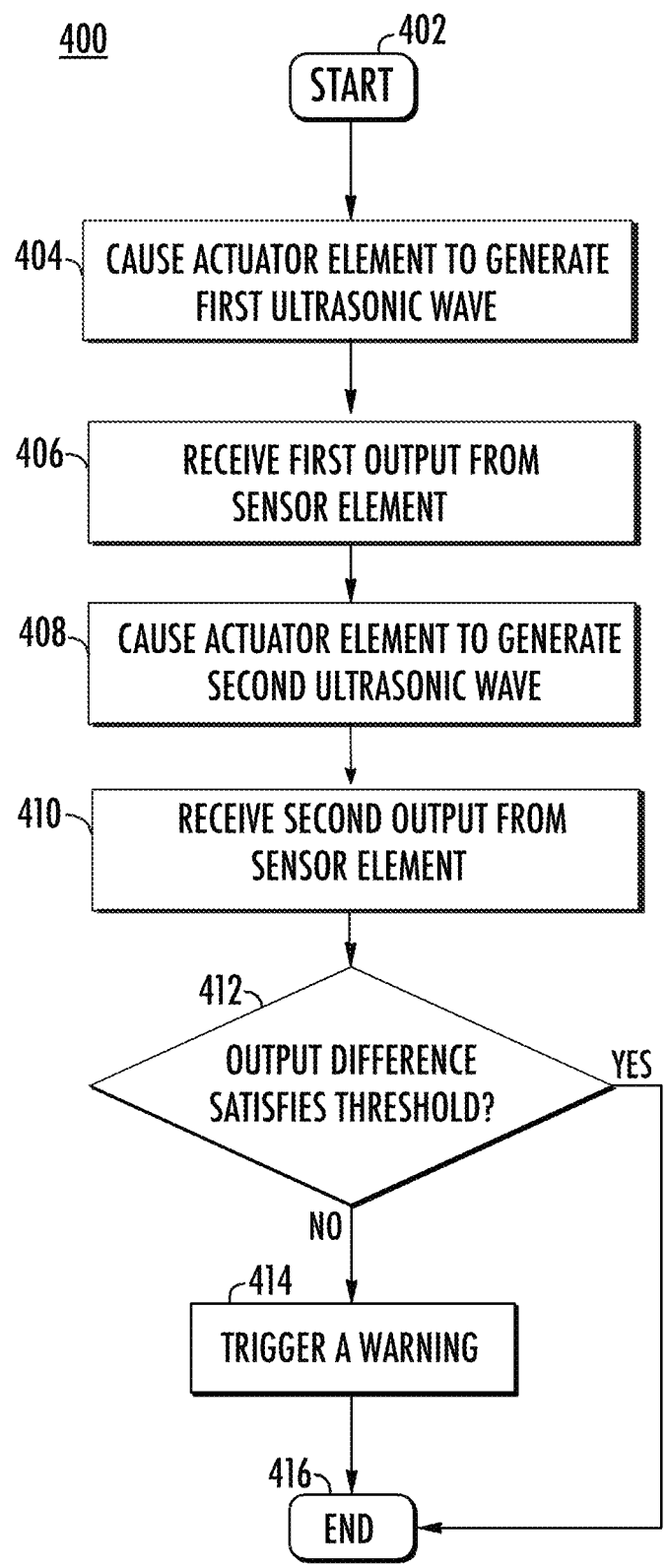
FIG. 4 illustrates an example flow diagram in accordance with various embodiments of the present disclosure.

Referring now to FIG. 4, example methods in accordance with various embodiments of the present disclosure are illustrated. In some examples, each block of the flowchart, and combinations of blocks in the flowchart, may be implemented by various means such as hardware, firmware, circuitry and/or other devices associated with execution of software including one or more computer program instructions.

In some examples, one or more of the procedures described in figures may be embodied by computer program instructions, which may be stored by a memory circuitry (such as a non-transitory memory) of an apparatus employing an embodiment of the present disclosure and executed by a processing circuitry (such as a processor) of the apparatus. These computer program instructions may direct the apparatus to function in a particular manner, such that the instructions stored in the memory circuitry produce an article of manufacture, the execution of which implements the function specified in the flowchart block(s). Further, the apparatus may comprise one or more other components, such as, for example, actuator element(s) and sensor element(s) described above in connection with FIG. 1. Various components of the apparatus may be in electronic communication between and/or among each other to transmit data to and/or receive data from each other.

In some examples, embodiments may take the form of a computer program product on a non-transitory computer-readable storage medium storing computer-readable program instructions (e.g. computer software). Any suitable computer-readable storage medium may be utilized including non-transitory hard disks, CD-ROMs, flash memory, optical storage devices, or magnetic storage devices.

Referring back to FIG. 4, an example method 400 in accordance with some embodiments of the present disclosure is illustrated. In particular, the example method 400 illustrates example embodiments of calculating various parameters for detecting an internal defect of a protective headgear. In some examples, the method 400 may be performed by a processing circuitry (for example, the processor element 111 described above in connection with FIG. 1 and/or processors of the one or more example computing devices 301A, 301B, . . . , 301N described above in connection with FIG. 3).

The method 400 starts at block 402.

At block 404, a processing circuitry (for example, the processor element 111 described above in connection with FIG. 1 and/or processors of the one or more example computing devices 301A, 301B, . . . , 301N described above in connection with FIG. 3) may cause an actuator element of an example apparatus (for example, the actuator element 107 of the example apparatus 100 described above in connection with FIG. 1) to generate a first ultrasonic wave. As described above in connection with FIG. 1, the actuator element may be integrated within the protective headgear, and the first ultrasonic wave may be propagated in the protective headgear.

In some examples, the actuator element may be configured to generate an ultrasonic wave at a fixed frequency. In some examples, the actuator element may be configured to generate ultrasonic waves at different frequencies, without deviating from the scope of the present disclosure.

At block 406, a processing circuitry (for example, the processor element 111 described above in connection with FIG. 1 and/or processors of the one or more example computing devices 301A, 301B, . . . , 301N described above in connection with FIG. 3) may receive a first output from a sensor element of the example apparatus (for example, the sensor elements 109A, 109B, 109C, or 109D of the example apparatus 100 described above in connection with FIG. 1) in response to the first ultrasonic wave. As described above in connection with FIG. 1, the sensor element may be integrated within the protective headgear, and the ultrasonic wave detected by the sensor element may have been propagated in the protective headgear.

In some examples, the output generated by the sensor element at block 406 may correspond to a wavelength of the ultrasonic wave as detected by the sensor element. In some examples, the sensor element may generate one or more output(s) correspond to other properties of the detected ultrasonic wave (for example, amplitude), without deviating from the scope of the present disclosure.

At block 408, a processing circuitry (for example, the processor element 111 described above in connection with FIG. 1 and/or processors of the one or more example computing devices 301A, 301B, . . . , 301N described above in connection with FIG. 3) may cause the actuator element (for example, the actuator element 107 of the example apparatus 100 described above in connection with FIG. 1) to generate a second ultrasonic wave.

In some examples, the second ultrasonic wave is propagated in the protective headgear. In some examples, the second ultrasonic wave may have one or more same properties as the first ultrasonic wave generated by the actuator element as described above in connection with block 404. For example, the second ultrasonic wave may have the same frequency as the first ultrasonic wave.

At block 410, a processing circuitry (for example, the processor element 111 described above in connection with FIG. 1 and/or processors of the one or more example computing devices 301A, 301B, . . . , 301N described above in connection with FIG. 3) may receive a second output from the sensor element (for example, the sensor elements 109A, 109B, 109C, or 109D of the example apparatus 100 described above in connection with FIG. 1) in response to the second ultrasonic wave.

In some examples, the output generated by the sensor element at block 410 may correspond to the same property of the detected ultrasonic wave as the output generated by the sensor element at block 406. For example, when the output generated by the sensor element at block 406 indicates a wavelength detected by the sensor element in response to the first ultrasonic wave, the output generated by the sensor element at block 410 may indicate a wavelength detected by the sensor element in response to the second ultrasonic wave.

Based on the first output and the second output, a processing circuitry (for example, the processor element 111 described above in connection with FIG. 1 and/or processors of the one or more example computing devices 301A, 301B, . . . , 301N described above in connection with FIG. 3) may determine whether the protective headgear comprises an internal defect. For example, at block 412, the processing circuitry may calculate an output difference between the second output and the first output.

As described above, in some examples, the output generated by the sensor element at block 406 may indicate a wavelength detected by the sensor element in response to the first ultrasonic wave, and the output generated by the sensor element at block 410 may indicate a wavelength detected by the sensor element in response to the second ultrasonic wave. In such examples, the output difference between the second output and the first output may correspond to a wavelength difference. In some examples, the output difference may correspond to other properties of the detected ultrasonic wave (for example, amplitude), without deviating from the scope of the present disclosure.

Referring back to block 412, a processing circuitry (for example, the processor element 111 described above in connection with FIG. 1 and/or processors of the one or more example computing devices 301A, 301B, . . . , 301N described above in connection with FIG. 3) may determine whether the output difference satisfies a pre-determined threshold.

In some examples, when one or more internal defects (for example, a crack) exist in a protective headgear, the one or more internal defects may create one or more discontinuities in the wave path as the ultrasonic wave being propagated in the protective headgear. The one or more discontinuities may reflect back at least part of the ultrasonic wave, creating one or more irregularities in the output generated by the sensor element.

In some examples, blocks 404 and 406 may be performed prior to the initial wearing of a protective headgear. In such examples, the first output received by the processor element at block 406 may indicate one or more properties of an ultrasonic wave propagated in a protective headgear that does not comprise any internal defect. Blocks 408 and 410 may be performed after the protective headgear has been used. As such, the output difference between the second output and the first output may indicate whether there is any internal defect in the protective headgear. In some examples, blocks 404 and 406 may be performed after the initial wearing of a protective headgear, without deviating from the scope of the present disclosure.

Additionally or alternatively, an example method may compare the first output (or the second output) with a pre-determined value to calculate an output difference, and the pre-determined value may indicate one or more properties of an ultrasonic wave propagated in a protective headgear that does not comprise any internal defect.

As described above, in some examples, the output difference between the second output and the first output may correspond to a wavelength difference. In such examples, the pre-determined threshold may be set based on the wavelength of the first ultrasonic wave (for example, less than half of the wavelength of the first ultrasonic wave) to reduce the likelihood of erroneous detection and false alarm due to, for example, environmental noise. In some examples, the pre-determined threshold may be set based at least in part on other suitable parameters (for example, the sensitivity and/or resolution of the sensor element), without deviating from the scope of the present disclosure.

Referring back to FIG. 4, in response to determining that the output difference satisfies the pre-determined threshold (for example, the output difference being less than half of the wavelength of the first ultrasonic wave), the processing circuitry may determine that there is no internal defect in the protective headgear, and the method 400 ends at block 416.

In response to determining that the output difference does not satisfy the pre-determined threshold (for example, the output difference being equal to or more than half of the wavelength of the first ultrasonic wave), the method 400 proceed to block 414. At block 414, the processing circuitry may trigger a warning in response to determining that the output difference does not satisfy the pre-determined threshold.

For example, the processing circuitry may cause an example speaker element to output an audio alert. As described in connection with FIG. 2 above, an example speaker element may be disposed on an outer surface of the protective headgear. Additionally or alternatively, an example speaker element may be separated from the protective headgear.

As another example, the processing circuitry may cause an example light-emitting diode (LED) element to output an audio alert. As described in connection with FIG. 2 above, an example LED element may be disposed on an outer surface of the protective headgear. Additionally or alternatively, an example LED element may be separated from the protective headgear.

As another example, the processing circuitry may cause an example vibrator element to output a vibration. As described in connection with FIG. 2 above, an example vibrator element may be integrated within the protective headgear. Additionally or alternatively, an example vibrator element may be separated from the protective headgear.

The method 400 ends at block 416.

Figure 5:
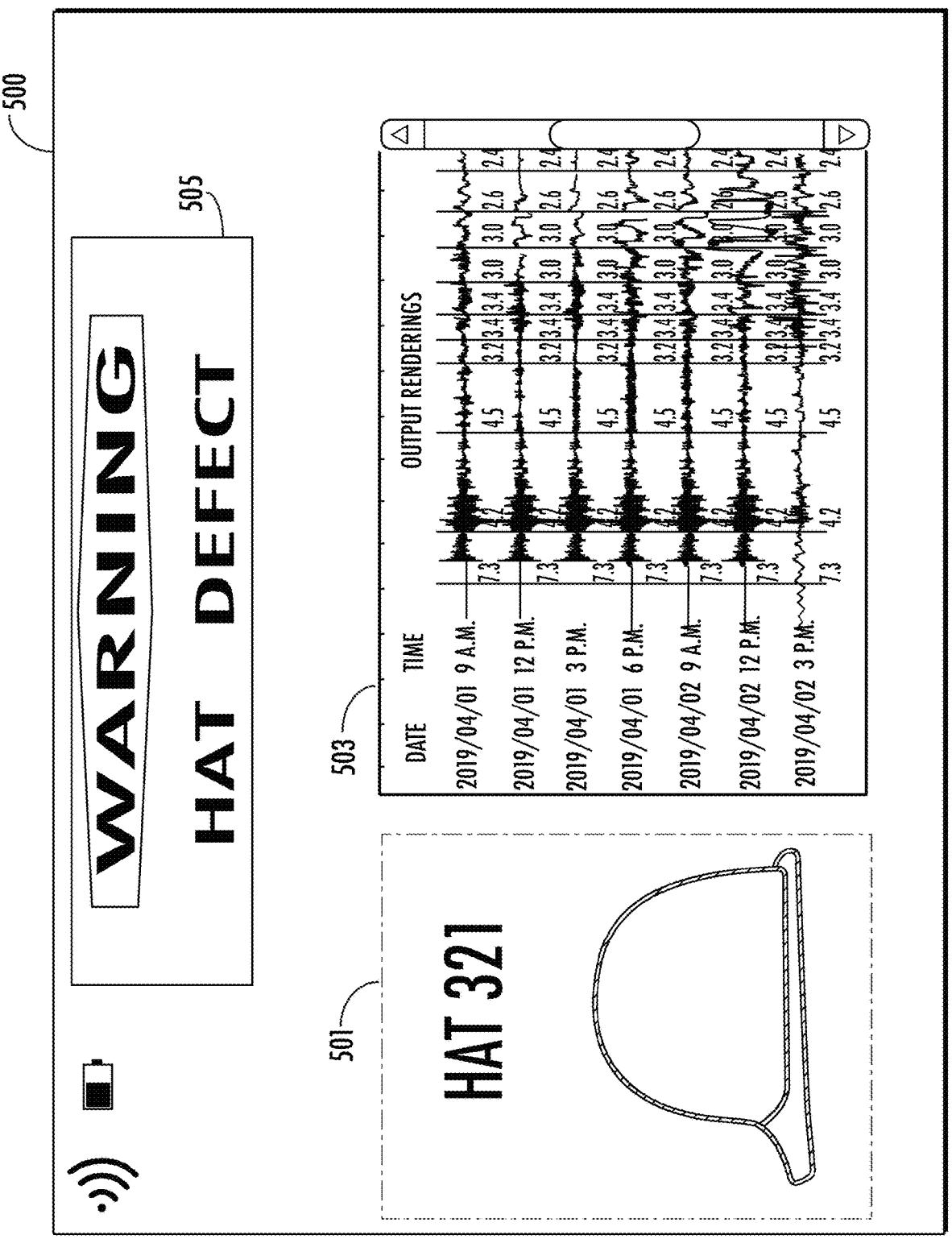
FIG. 5 illustrates an example user interface in accordance with various embodiments of the present disclosure.
Figure 6:
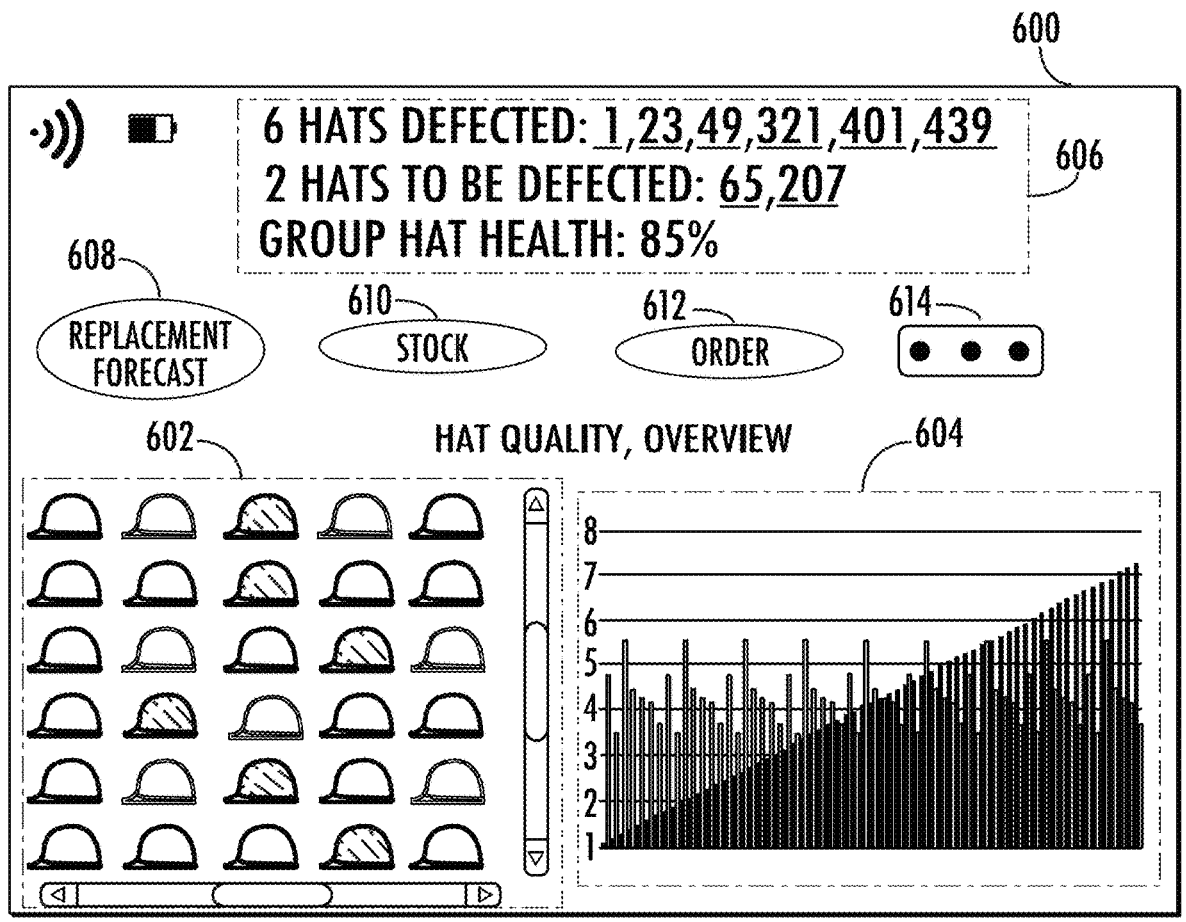
FIG. 6 illustrates an example user interface in accordance with various embodiments of the present disclosure.

Referring now to FIGS. 5-6, example user interfaces in accordance with various examples of the present disclosure are illustrated. In particular, a user may operate an example computing device (such as, for example, example computing devices 301A, 301B, . . . , 301N described above in connection with FIG. 3) to view and/or interact with example user interfaces as illustrated in FIGS. 5-6 via a display of the example computing device. It is noted that the scope of the present disclosure is not limited to desktop computer or mobile phone, and other devices may be used in accordance with embodiments of the present disclosure (including, for example, wearable devices) to view and/or interact with example user interfaces in accordance with various embodiments of the present disclosure.

Referring now to FIG. 5, an example user interface 500 is shown. In particular, the example user interface 500 illustrates an example dashboard interface for monitoring a single protective headgear. As shown in FIG. 5, the user interface 500 may comprise a protective headgear identification portion 501 and an output rendering portion 503.

The protective headgear identification portion 501 may display a graphic representation of the protective headgear, and/or an identification number of the protective headgear. The output rendering portion 503 may comprise rendering of output(s) associated with sensor element(s) and/or the processor element integrated within the protective headgear. For example, the processor element may (process and) transmit the first output and the second output to the computing device, and may cause the rendering of the first output and the second output on the output rendering portion 503 of the user interface 500. In the example embodiment as shown in FIG. 5, the output rendering portion 503 may also display date and time associated with each output.

In some examples, when a processing circuitry (for example, the processor element 111 described above in connection with FIG. 1 and/or processors of the one or more example computing devices 301A, 301B, . . . , 301N described above in connection with FIG. 3) determine that the protective headgear (as indicated in the protective headgear identification portion 501) comprises one or more internal defects (for example, based on the method 400 described above in connection with FIG. 4), the user interface 500 may further comprise a warning portion 505, which may display a warning message that there may be internal defect(s) in the protective headgear.

As illustrated above in connection with FIG. 3, a plurality of example apparatuses in accordance with the present disclosure may be in electronic communication with one or more computing device. As such, one computing device may be configured to receive data from a group of example apparatuses. Referring now to FIG. 6, an example user interface 600 is shown. In particular, the example user interface 600 illustrates an example dashboard interface for monitoring a group of protective headgears.

As shown in FIG. 6, the user interface 600 may comprise a headgear identification portion 602 and an output rendering portion 604.

The headgear identification portion 602 may display graphic representations of protective headgears within the group. In some examples, each of the protective headgears may be associated with a unique identifier, and unique identifiers of protective headgears in the group may be stored in a memory circuitry of the computing device. In some examples, the unique identifier may be in the form of a number string, an American Standard Code for Information Interchange (ASCII) text, a pointer, and/or the like.

In some examples, the headgear identification portion 602 may indicate the status of each protective headgear in the group. For example, a shaded graphic representation of a protective headgear may indicate that the corresponding protective headgear may comprise one or more defects. As another example, a color-filled graphic representation of a protective headgear may indicate that the corresponding protective headgear may soon be affected by one or more internal defects, as described below.

The output rendering portion 604 may comprise rendering of one or more output(s) associated with sensor element(s) and/or the processor element integrated within the protective headgears in the group, similar to the output rendering portion 503 described above in connection with FIG. 5. In some examples, each of the outputs may be associated with a unique identifier. In the example embodiment as shown in FIG. 6, the outputs may be rendered as bars in the bar graph in the output rendering portion 604.

In some examples, the user interface 600 may also comprise a group status portion 606. The group status portion 606 may display information such as, for example, the unique identifiers of protective headgears that may comprise one or more internal defects (for example, based on the method 400 described above in connection with FIG. 4). Additionally or alternatively, the group status portion 606 may display information indicating the "health status" of protective headgear group, which may be calculated based on dividing the number of protective headgears that do not comprise internal defect by the total number of protective headgears in the group.

In some examples, the computing device may implement machine learning models (such as, for example, time-series forecasting models) based on historical data associated with the protective headgears in the group to generate a forecast of protective headgear(s) that may soon be affected by one or more internal defects. In some examples, the group status portion 606 may display information indicating the unique identifier(s) of protective headgear(s) that may soon be affected by one or more internal defects. In some examples, the user interface 600 may display these unique identifiers after the "Replacement Forecast" button 608 is clicked, tapped, or otherwise selected by a user operating the computing device.

In some examples, the user interface 600 may comprise one or more buttons, such as the "Stock" button 610, the "Order" button 612, and the "More Information" button 614. When a user clicks, taps, or otherwise selects the "Stock" button 610, the user interface 600 may display the total number of protective headgears in the group. When a user clicks, taps, or otherwise selects the "Order" button 612, the computing device may render one or more user interfaces that may facilitate the ordering of an example apparatus in accordance with the present disclosure. When a user clicks, taps, or otherwise selects the "More Information" button 614, the user interface 600 may display additional information associated with the protective headgear group.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus, comprising:
a protective headgear;
an actuator element integrated within the protective headgear;
a sensor element integrated within the protective headgear; and
a processor element electronically coupled to the actuator element and the sensor element, wherein the processor element is configured to:
cause the actuator element to generate a first ultrasonic wave, wherein the first ultrasonic wave is propagated in the protective headgear; and
receive a first output from the sensor element in response to the first ultrasonic wave.

2. The apparatus of claim 1, wherein the processor element is further configured to:
cause the actuator element to generate a second ultrasonic wave, wherein the second ultrasonic wave is propagated in the protective headgear;
receive a second output from the sensor element in response to the second ultrasonic wave; and
determine whether the protective headgear comprises an internal defect based on the first output and the second output.

3. The apparatus of claim 2, wherein, when determining whether the protective headgear comprises the internal defect, the processor element is further configured to:
calculate an output difference between the second output and the first output; and
determine whether the output difference satisfies a pre-determined threshold.

4. The apparatus of claim 3, further comprising a speaker element disposed on an outer surface of the protective headgear and electronically coupled to the processor element, wherein the processor element is further configured to:
determine that the output difference does not satisfy the pre-determined threshold; and
in response to determining that the output difference does not satisfy the pre-determined threshold, cause the speaker element to output an audio alert.

5. The apparatus of claim 3, further comprising a light-emitting diode (LED) element disposed on an outer surface the protective headgear and electronically coupled to the processor element, wherein the processor element is further configured to:
determine that the output difference does not satisfy the pre-determined threshold; and
in response to determining that the output difference does not satisfy the pre-determined threshold, cause the LED element to generate a visual alert.

6. The apparatus of claim 3, further comprising a vibrator element integrated within the protective headgear and electronically coupled to the processor element, wherein the processor element is further configured to:
determine that the output difference does not satisfy the pre-determined threshold; and in response to determining that the output difference does not satisfy the pre-determined threshold, cause the vibrator element to generate a vibration.

7. The apparatus of claim 2, wherein the processor element is further configured to:
transmit the first output and the second output to a computing device; and
cause a rendering of the first output and the second output on a display of the computing device.

8. A method for detecting an internal defect of a protective headgear, comprising:
causing an actuator element to generate a first ultrasonic wave, wherein the actuator element is integrated within the protective headgear, wherein the first ultrasonic wave is propagated in the protective headgear; and
receiving a first output from a sensor element in response to the first ultrasonic wave, wherein the sensor element is integrated within the protective headgear.

9. The method of claim 8, further comprising:
causing the actuator element to generate a second ultrasonic wave, wherein the second ultrasonic wave is propagated in the protective headgear;
receiving a second output from the sensor element in response to the second ultrasonic wave; and
determining whether the protective headgear comprises the internal defect based on the first output and the second output.

10. The method of claim 9, wherein determining whether the protective headgear comprises the internal defect further comprises:
calculating an output difference between the second output and the first output; and
determining whether the output difference satisfies a pre-determined threshold.

11. The method of claim 10, further comprising:
determining that the output difference does not satisfy the pre-determined threshold; and
in response to determining that the output difference does not satisfy the pre-determined threshold, causing a speaker element to output an audio alert, wherein the speaker element is disposed on an outer surface of the protective headgear.

12. The method of claim 10, further comprising:
determining that the output difference does not satisfy the pre-determined threshold; and
in response to determining that the output difference does not satisfy the pre-determined threshold, causing a light-emitting diode (LED) element to output an audio alert, wherein the LED element is disposed on an outer surface of the protective headgear.

13. The method of claim 10, further comprising:
determining that the output difference does not satisfy the pre-determined threshold; and
in response to determining that the output difference does not satisfy the pre-determined threshold, causing a vibrator element to output a vibration, wherein the vibrator element is integrated within the protective headgear.

14. The method of claim 9, further comprising:
transmitting the first output and the second output to a computing device; and
causing a rendering of the first output and the second output on a display of the computing device.

15. A computer program product comprising at least one non-transitory computer-readable storage medium having computer-readable program code portions stored therein, the computer-readable program code portions comprising an executable portion configured to:
cause an actuator element to generate a first ultrasonic wave, wherein the actuator element is integrated within a protective headgear, wherein the first ultrasonic wave is propagated in the protective headgear; and
receive a first output from a sensor element in response to the first ultrasonic wave, wherein the sensor element is integrated within the protective headgear.

16. The computer program product of claim 15, wherein the executable portion is configured to further:
cause the actuator element to generate a second ultrasonic wave, wherein the second ultrasonic wave is propagated in the protective headgear;
receive a second output from the sensor element in response to the second ultrasonic wave; and
determine whether the protective headgear comprises an internal defect based on the first output and the second output.

17. The computer program product of claim 16, wherein, when determining whether the protective headgear comprises the internal defect, the executable portion is configured to further:
calculate an output difference between the second output and the first output; and
determine whether the output difference satisfies a pre-determined threshold.

18. The computer program product of claim 17, wherein the executable portion is configured to further:
determine that the output difference does not satisfy the pre-determined threshold; and
in response to determining that the output difference does not satisfy the pre-determined threshold, cause a speaker element to output an audio alert, wherein the speaker element is disposed on an outer surface of the protective headgear.

19. The computer program product of claim 17, wherein the executable portion is configured to further:
determine that the output difference does not satisfy the pre-determined threshold; and
in response to determining that the output difference does not satisfy the pre-determined threshold, cause a light-emitting diode (LED) element to output an audio alert, wherein the LED element is disposed on an outer surface of the protective headgear.

20. The computer program product of claim 17, wherein the executable portion is configured to further:
determine that the output difference does not satisfy the pre-determined threshold; and
in response to determining that the output difference does not satisfy the pre-determined threshold, cause a vibrator element to output a vibration, wherein the vibrator element is integrated within the protective headgear.

* * * * *